Figure 1:
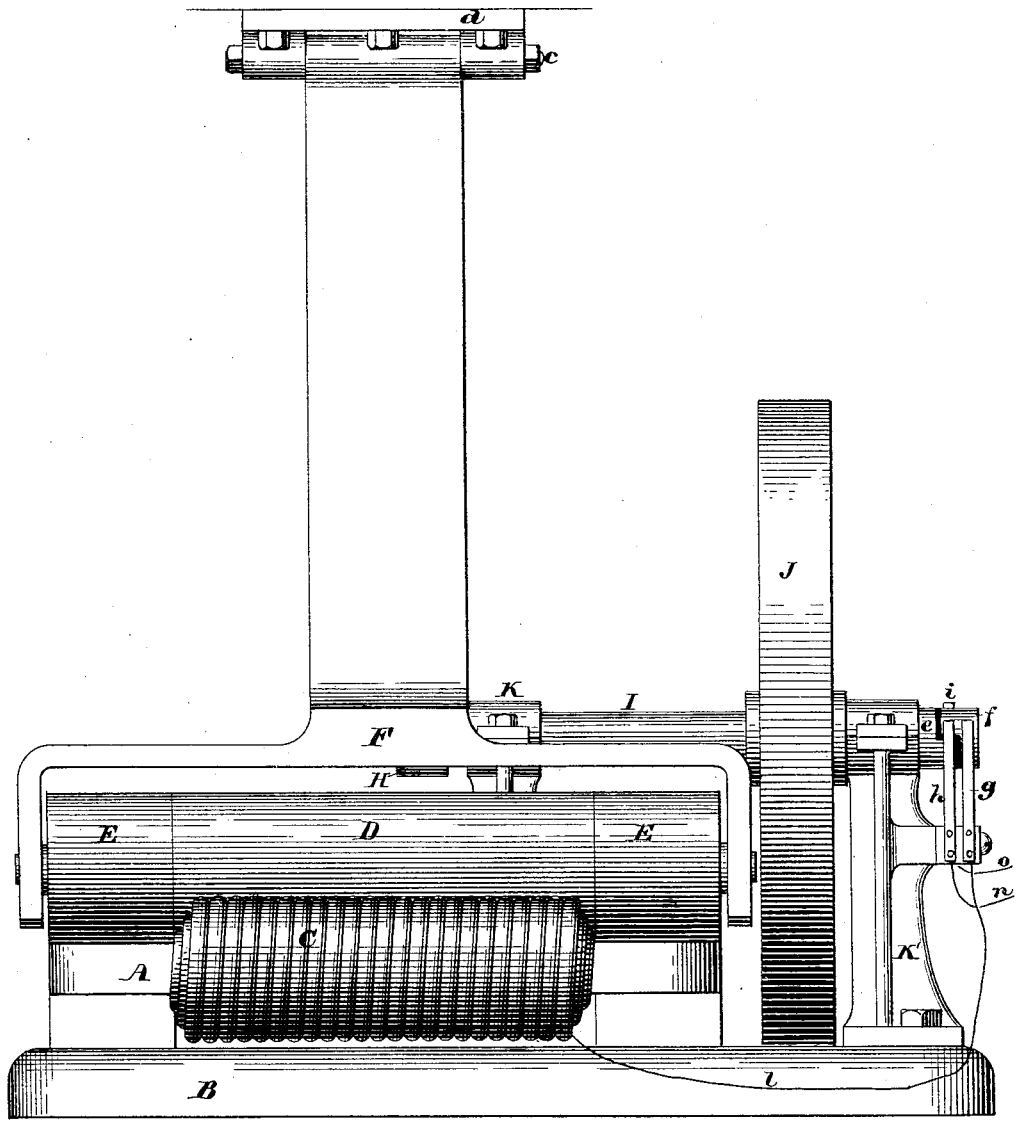

(No Model.) 4 Sheets—Sheet 3.
C. C. PECK & W. H. CHAPMAN.
MAGNETO ELECTRIC GENERATOR.

No. 276,274. Patented Apr. 24, 1883.

Witnesses.
Walter E. Lombard.
Thomas Hibbard

Inventors:
Charles C. Peck,
Wm H. Chapman.
by N. C. Lombard
Attorney.

(No Model.) 4 Sheets—Sheet 4.

C. C. PECK & W. H. CHAPMAN.
MAGNETO ELECTRIC GENERATOR.

No. 276,274. Patented Apr. 24, 1883.

Witnesses:
Walter E. Lombard.
Thomas Hibbard

Inventors:
Charles C. Peck
Wm. H. Chapman
by N. C. Lombard
Attorney.

UNITED STATES PATENT OFFICE.

CHARLES C. PECK AND WILLIAM H. CHAPMAN, OF MIDDLEBURY, VERMONT.

MAGNETO-ELECTRIC GENERATOR.

SPECIFICATION forming part of Letters Patent No. 276,274, dated April 24, 1883.

Application filed August 30, 1882. (No model.)

*To all whom it may concern:*

Be it known that we, CHARLES C. PECK and WILLIAM H. CHAPMAN, both of Middlebury, in the county of Addison and State of Vermont, have invented certain new and useful Improvements in Electric Generators, of which the following, taken in connection with the accompanying drawings, is a specification.

When a soft-iron armature is placed across the poles of an excited electro-magnet it is a well-known fact that even a great while after the exciting electric current has ceased the armature adheres very firmly to the magnet, and this adhesion is stronger in proportion to the perfection and extent of the contact. This phenomenon is sometimes confounded with "residual" magnetism, but a slight consideration will show that it is altogether a different thing, for the softer the iron the better does the phenomenon show itself. Also, the adhesion is destroyed when the two adhering surfaces are once separated, both of which considerations are directly opposite to the action of residual magnetism; but this adhesion is due to opposite magnetisms being "condensed" or "bound" on the surfaces in contact just as static electricity is bound on the opposite coatings of a Leyden jar. To separate two surfaces that are thus oppositely polarized requires the exertion of considerable force and at the instant of separation of the soft-iron surfaces a large amount of magnetism is set free, which exerts a powerful dynamic effect on a wire surrounding the soft-iron pieces; but the force required to cause this separation of a single magnet and armature is considerably more than what is represented in the electric current caused thereby in the wire, and hence in generating a current on this contact principle it is desirable to get rid of this unnecessary exertion of force.

To accomplish this end is one of the objects of our present invention; and it is effected by so arranging the armatures that their poles will overlap or project by each other in the manner hereinafter explained, and by rolling the magnet along the surface of said armatures, so as to gradually increase the extent of its contact with one armature as it gradually diminishes contact with the other, the inducing action of the magnet is thus simply shifted from one armature to another without any abrupt separation of magnetisms thus condensed, and all the force exerted against magnetic influence is represented in the current produced in the wire on the armatures. This action of condensation between a permanent magnet and its armature is the same as that of an electro-magnet, in which case nearly all of the magnetism is condensed on the contact-surface and thus made available; but in order for the whole mass of the permanent steel magnet to transmit its magnetism readily to the under surface where the condensation takes place it is necessary to have a soft-iron pole-piece coming in contact with a considerable surface of the steel to collect and deliver the magnetism of every part. To effect this and to secure perfection and greater extent of contact of the pole-pieces with the armatures are also objects of our present invention, which consists in an improved construction and arrangement of the magnets and armatures, all of which will be best understood by reference to the description of the drawings, and to the claims to be hereinafter given.

Figure 2:
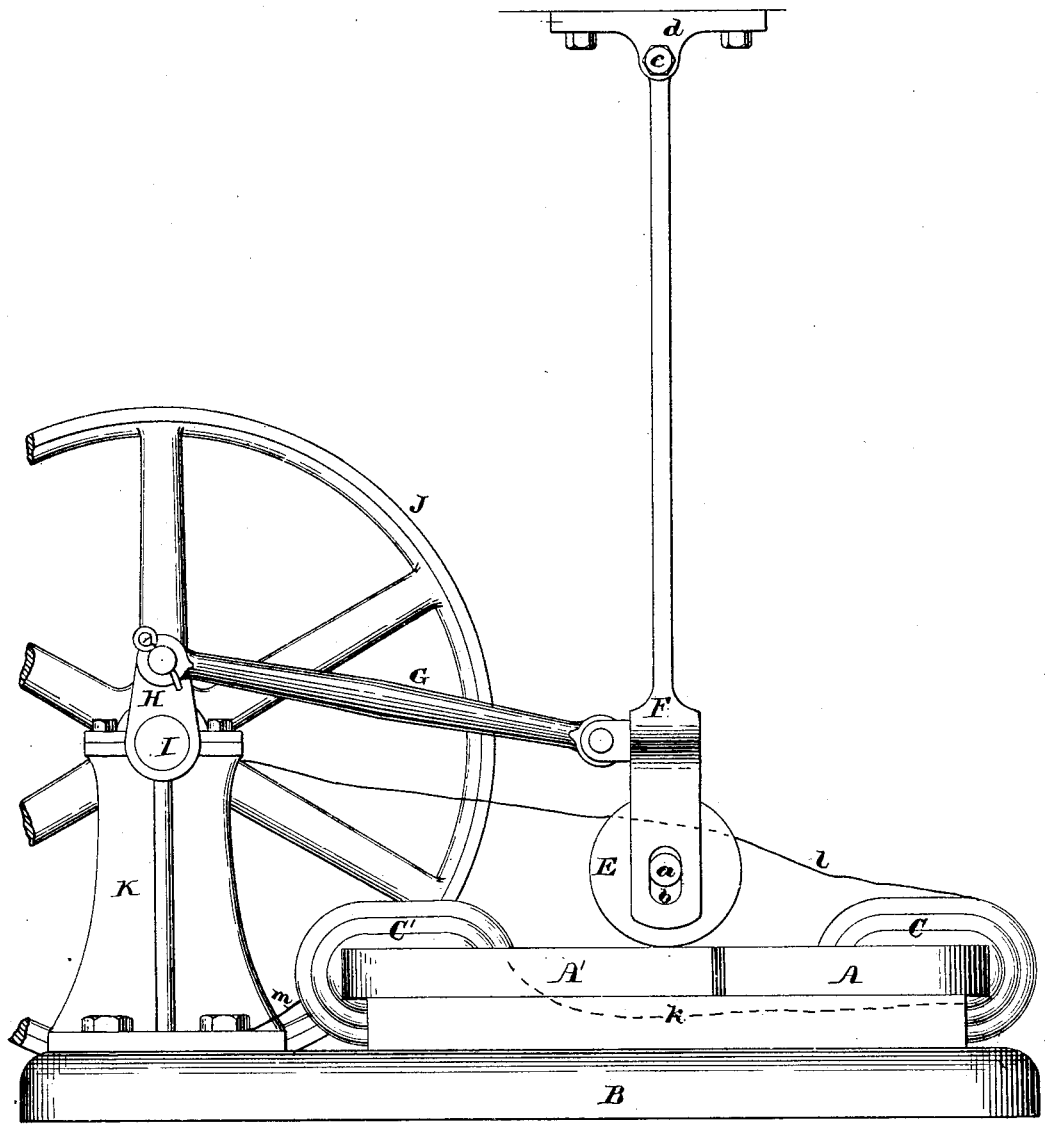
Figure 6:
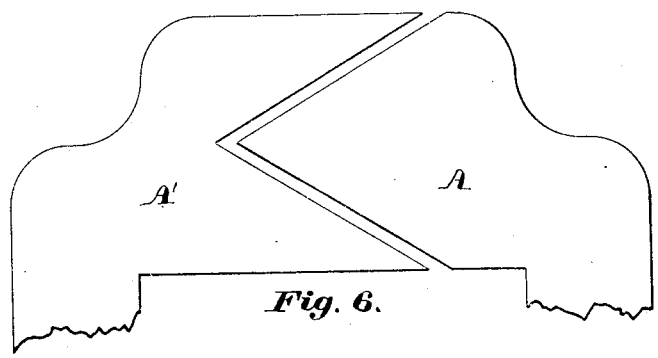
Figure 3:
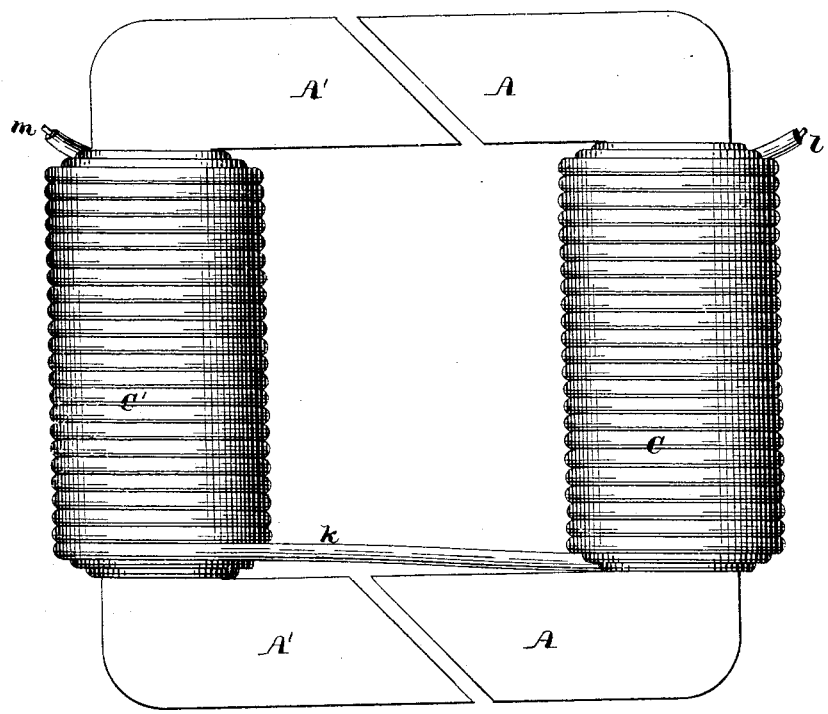
Figure 8:
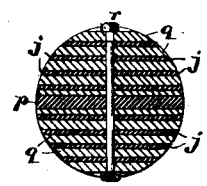
Figure 5:
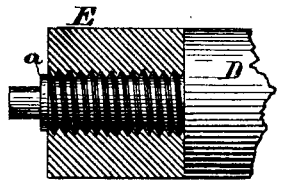
Figure 7:
Figure 4:
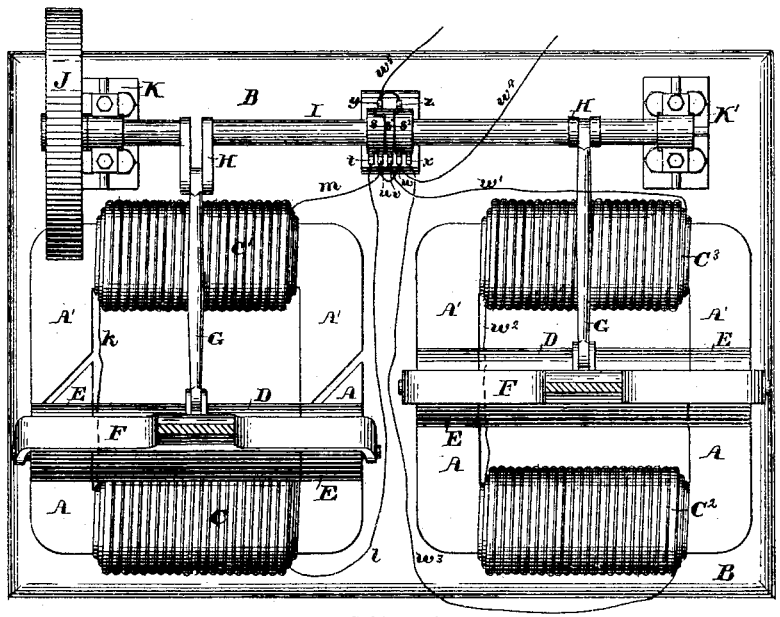

In the drawings, Figure 1 is an elevation of an electric generator embodying our invention. Fig. 2 is also an elevation, looking at the left-hand side, as seen in Fig. 1. Fig. 3 is a plan of the armatures and their conducting-coils. Fig. 4 is a plan of a machine employing two sets of armatures and magnets for producing a steady current, drawn to a reduced scale. Fig. 5 is a sectional elevation of one end of the rolling magnet. Fig. 6 is a detail showing an improved form of the armatures. Fig. 7 is an elevation of a modified form of the rolling magnet, and Fig. 8 is a section of the same on line 1 1 of Fig. 7.

A A' are two soft-iron armatures, supported upon and secured to the bed B, said armatures being provided with conducting-coils C and C', respectively.

D is a permanent magnet, cylindrical in form, and provided at its opposite ends with the soft-iron pole-pieces E E, screwed upon the shanks $a\ a$, of reduced diameter, as shown in Fig. 5, or otherwise secured to the ends of the magnet D, said magnet being adapted to rock or roll back and forth upon the armatures A A', with the pole-pieces E E in contact with the ends or poles of said armatures. Each of the shanks $a\,a$ has a journal at its outer end, said journals having bearings in slots $b\,b$ in the lower ends of the forked pendent radius-arm F, pivoted at $c$ to a hanger, $d$. The radius-arm F has a back-and-forth or vibrating motion imparted thereto by means of the connecting-rod G, connected at one end to the radius-arm F, and at the other end to the crank H, secured upon the driving-shaft I, which in turn may have motion imparted to it by means of the pulley J, secured thereon, and a belt, (not shown,) or in any suitable manner.

K K' are two standards, in which the driving-shaft I has its bearings.

The ends or poles of the armatures A and A' are so shaped as to overlap each other, the ends of the armature A projecting beyond the ends of the armature A', as shown in Fig. 3; or the narrow space separating said armatures may be V-shaped, as shown in Fig. 6, so that as the magnet D rolls back and forth and passes from one armature to the other it will gradually increase the extent of contact of the pole-pieces E E with one armature as it gradually diminishes contact with the other armature, the advantage of this arrangement being that any sudden separation of magnetisms is prevented and the consequent power required to effect such separation is dispensed with, as previously mentioned, and thus the machine is capable of being operated with much less power than would otherwise be the case.

If the magnet D were made to roll directly in contact with the armatures A A', only a small portion of its magnetism would be transmitted to its under surface, where the condensation takes place. In order to collect the magnetism from every part of the magnet D, we secure to its ends the soft-iron pole-pieces E E, which readily transmit the magnetism so collected and deliver it to the under surface of said pole-pieces in contact with the armatures A and A'. To obtain a greater extent of contact-surface of the armatures A A' we extend or expand their pole ends outwardly, as clearly shown in Fig. 6. The contact-surfaces of said armatures should be planed perfectly true and then polished, and the pole-pieces E E are likewise polished after being turned to fit perfectly the surface upon which they are to roll, the object being to obtain a greater perfection of contact.

At the end of the shaft I, opposite to the crank H, is arranged a commutator of ordinary and well-known construction for rectifying the current obtained from the coils C C'. The commutator consists of two rings of metal, $e$ and $f$, surrounding the shaft I and revolving therewith, and the three springs $g$, $h$, and $i$, attached to a lug projecting from the standard K'. The inner end of the coil C is connected by a wire, $k$, with the outer end of the coil C'. The outer end of the coil C is connected by wire $l$ with the spring $g$, and the inner end of the coil C' is connected with the ring $e$ through the medium of the wire $m$, standard K, shaft I, and a suitable set-screw (not shown) connecting the said shaft with the ring $e$. The strip $f$ is insulated from the shaft I. The spring $h$ is connected by wire $n$ with one end of the line or circuit, while the other end of the circuit is connected by wire $o$ with the spring $i$ upon the opposite side of the shaft I. The inner end of the coil C' may be connected to the ring $e$ by means of a wire and a spring pressing against said ring, in which case the ring $e$ may be entirely insulated from the shaft I.

The magnet D is stronger if made of separate strips secured to the pole-pieces E E, as shown in Figs. 7 and 8, where each of the pole-pieces E E has a lug, $p$, projecting inwardly therefrom, to which lugs the strips $q$, composing the magnet, are secured by the bolts $r\,r$, as shown, said strips being separated from each other by the thin pieces of soft iron $j$.

In order to generate a steady current it is necessary to have two or more sets of armatures and magnets. In Fig. 4 is shown a plan of a machine employing two sets of armatures and magnets, the arrangement of which will be readily understood by reference to the drawings. The commutator in this case is composed of three metal rings, $s$, $s'$, and $s^2$, secured upon the shaft I, but all insulated therefrom and from each other, and seven springs, $t$, $u$, $v$, $w$, $x$, $y$, and $z$. The inner end of the coil C is connected by wire $k$ with the outer end of the coil C', and the outer end of the coil C is connected by wire $l$ with the spring $t$. The inner end of the coil C' is connected by wire $m$ with the spring $v$, which is also connected by wire $w'$ with the inner end of the coil C$^3$, the outer end of which is connected by wire $w^2$ with the inner end of the coil C$^2$, and the outer end of the coil C$^2$ is connected by wire $w^3$ to the spring $x$. The spring $u$ is connected by a short wire with the spring $w$, which is also connected by wire $w^4$ with one end of the circuit, the other end of the circuit being connected by wire $w^5$ to the spring $y$, which is also connected by a short wire with the spring $z$.

The magnet D and its pole-pieces E E are shown as being made cylindrical in form; but it is not necessary to confine them to this shape, provided that the curved contact-surfaces of the pole-pieces extend through an arc sufficiently long to allow of the proper rolling or rocking movement upon the armatures. To facilitate this rolling movement the contact-surfaces of the armatures A A' may be made concave, the radius of the curve being equal to the distance from said surface to the pivot $c$, and thus the journals upon the ends of the shanks $a\,a$ will have little or no vertical movement in the slots $b\,b$.

What we claim as new, and desire to secure by Letters Patent of the United States, is—

1. Two soft-iron armatures arranged side by side with their ends in proximity to each other, provided with conducting-coils, in combination with a permanent magnet having curved surfaces adapted to rock or roll from one armature to the other in contact therewith, substantially as and for the purposes described.

2. In an electric generator, two soft-iron armatures provided with conducting-coils, and having their ends shaped and arranged to overlap or project by each other, substantially as and for the purposes described.

3. Two soft-iron armatures having their ends shaped and arranged to overlap or project by each other, in combination with a permanent magnet having at its ends curved contact-surfaces arranged to rock or roll from one armature to the other in contact therewith, substantially as and for the purposes described.

4. Two soft-iron armatures arranged side by side with their ends in proximity to each other, and provided with conducting-coils, in combination with a permanent magnet provided at its ends with soft-iron pole-pieces constructed and arranged to rock or roll from one armature to the other in contact therewith, substantially as and for the purposes described.

5. Two soft-iron armatures arranged side by side with their ends in proximity to each other, and provided with conducting-coils, in combination with a permanent magnet mounted and adapted to move about its axis in bearings in a forked pendent radius-arm, and provided at its ends with soft-iron pole-pieces, said magnet being arranged to rock or roll from one armature to the other with its pole-pieces in contact therewith, substantially as and for the purposes described.

6. In combination with a permanent magnet provided with soft-iron pole-pieces secured to its ends, two soft-iron armatures provided with conducting-coils, and having their pole ends expanded outwardly, substantially as and for the purposes described.

In testimony whereof we have signed our names to this specification, in the presence of two subscribing witnesses, on this 24th day of August, A. D. 1882.

CHARLES C. PECK.
WILLIAM H. CHAPMAN.

Witnesses:
CHARLES E. PINNEY,
GEO. M. FLETCHER.